United States Patent [19]

Kawanami

[11] Patent Number: 5,278,601
[45] Date of Patent: Jan. 11, 1994

[54] OPTICAL APPARATUS

[75] Inventor: Akihiro Kawanami, Kanagawa, Japan

[73] Assignee: Canon Kabushiki Kaisha, Tokyo, Japan

[21] Appl. No.: 997,081

[22] Filed: Dec. 29, 1992

[30] Foreign Application Priority Data

Jan. 7, 1992 [JP] Japan .................. 4-001029
Jul. 10, 1992 [JP] Japan .................. 4-183834

[51] Int. Cl.$^5$ ............................................. G03B 03/00
[52] U.S. Cl. ................................. 354/400; 354/195.1
[58] Field of Search ............... 354/400, 195.1, 195.13; 358/227; 359/676, 694, 696, 703, 704, 705, 706, 822, 823, 824, 825

[56] References Cited

U.S. PATENT DOCUMENTS 4,864,344  9/1989  Arokawa et al. ................. 354/400

Primary Examiner—Michael L. Gellner
Assistant Examiner—Howard B. Blankenship
Attorney, Agent, or Firm—Robin, Blecker, Daley & Driscoll

[57] ABSTRACT

An optical apparatus includes a driving part for driving an optical member such as a lens or the like to move along its optical axis, a rotary operation member arranged to determine the moving direction of the optical member by the rotating direction of the rotary operation member, a switching part arranged to permit switching a relationship between the rotating direction of the rotary operation member and the moving direction of the optical member, and a control part arranged to control the driving part to cause the optical member to move in one of two opposite directions according to the rotating direction of the rotary operation member and the switching position of the switching part.

18 Claims, 15 Drawing Sheets

5,278,601

OPTICAL APPARATUS

BACKGROUND OF THE INVENTION

1. Field of the Invention

This invention relates to an optical apparatus of the kind arranged to convert the result of a manual operation into an electrical signal or the like and to move an optical member such as a lens by driving a power source such as a motor according to the electrical signal.

2. Description of the Related Art

It is known to arrange a power focusing device or a power zooming device to permit a manual rotating operation on a focus ring or a zoom ring, to convert the result of the manual operation into an electrical signal and to move a focusing lens or a power varying lens by driving a power source according to the electrical signal, as disclosed, for example, in U.S. Pat. No. 4,864,344. Interchangeable lenses which are equipped with the power focusing or zooming devices of this kind for single-lens reflex cameras are now on the market. The lens moving direction in relation to the rotating direction of the focus or zoom rings of these interchangeable lenses, however, varies with the manufacturers of them. While an interchangeable lens made by a manufacturing company A is arranged, for example, to move a lens unit forward when the ring is manually rotated clockwise, an interchangeable lens made by another manufacturing company B is arranged to move the lens unit backward when the ring is manually rotated in the same direction.

Since the moving direction of the lens in relation to the rotating direction of the rotary operation ring of the commercially available interchangeable lenses which are of the kind having a power manipulating type lens-driving device such as a power focusing device or a power zooming device varies with the manufacturers of them, as mentioned above, a camera operator accustomed to using an interchangeable lens made by one manufacturing company A tends to erroneously operate an interchangeable lens made by the other manufacturing company B. The product of the manufacturing company B, therefore, cannot be adequately used even if the operator wishes to use it.

SUMMARY OF THE INVENTION

This invention is directed to the solution of the above-stated problem. One aspect of the invention, therefore, lies in the provision of an optical apparatus which is of the kind detecting the rotation of a rotary operation member and causing an optical member to move in a direction according to the rotating direction of the rotary operation member and which is arranged such that the relationship between the rotating direction of the rotary operation member and the moving direction of the optical member can be switched from one relation over to another relation.

The above and other aspects and features of this invention will become apparent from the following detailed description of embodiments thereof taken in connection with the accompanying drawings.

DETAILED DESCRIPTION OF THE PREFERRED EMBODIMENTS

The following describes by way of example some of the embodiments of this invention. These embodiments relate to a single-lens reflex camera consisting of an interchangeable lens having a power focus device and a camera body connected to the interchangeable lens.

EMBODIMENT 1

Figure 1:
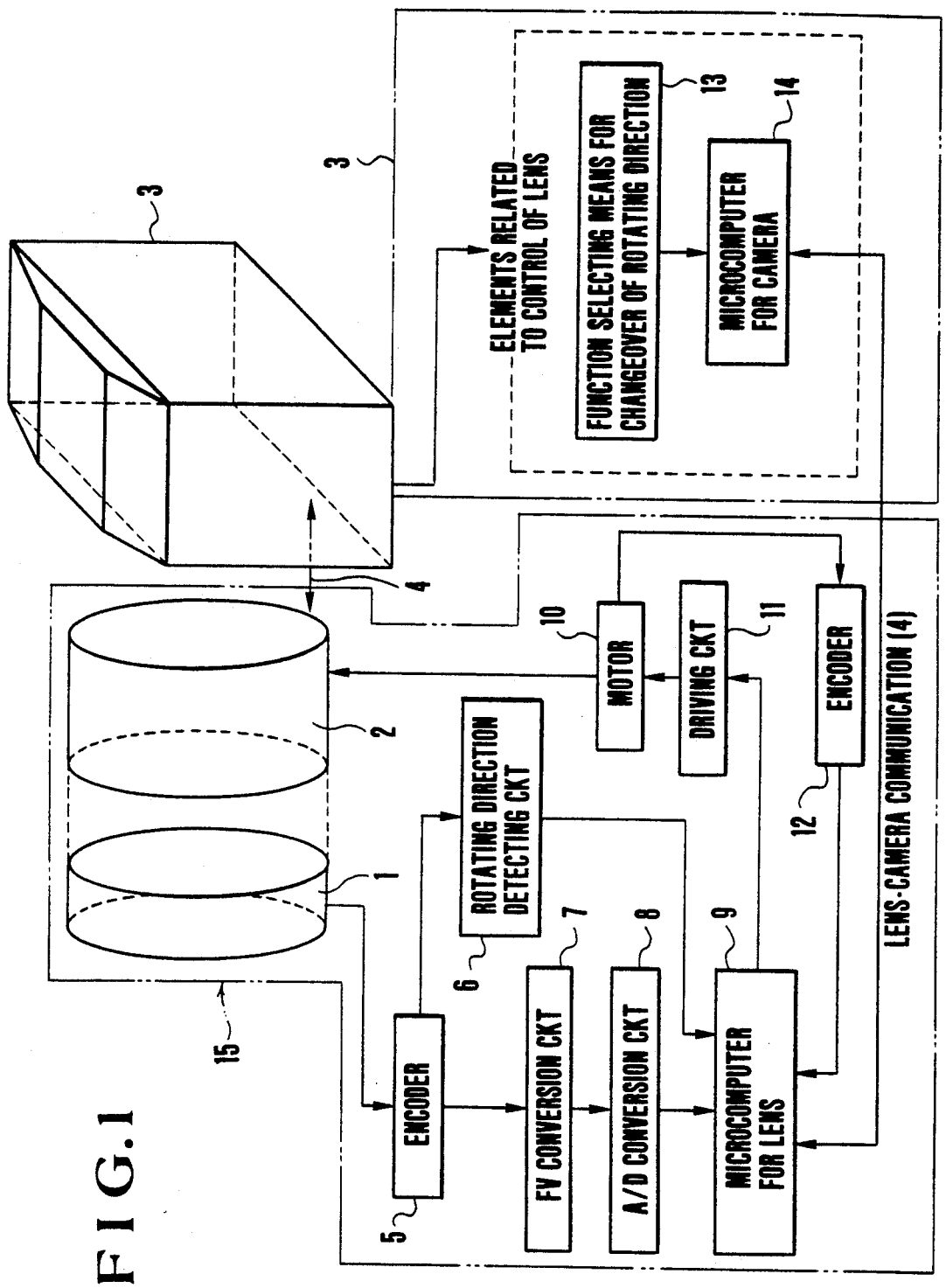
FIG. 1 is a block diagram showing in outline the essential parts of an optical apparatus which is a single-lens reflex camera arranged according to this invention as a first embodiment thereof.

Referring to FIG. 1, there is provided a focus ring 1 for giving an instruction designating the direction and amount of a driving action on a focusing lens unit 2. Reference numeral 3 denotes the camera body. Reference numeral 4 denotes a contact unit for communication between the camera body 3 and the interchangeable lens 15. An encoder unit 5 is arranged to detect the rotational frequency and the rotating direction of the focus ring 1 when the focus ring 1 is operated to rotate. A rotating direction detecting circuit 6 is arranged to electrically detect the output signal of the encoder unit 5 by converting it into a rotating direction when the focus ring 1 is operated to rotate. An FV conversion circuit 7 is arranged to convert the output signal of the encoder unit 5 from a rotational frequency into a voltage when the focus ring 1 is operated to rotate. An A/D conversion circuit 8 is arranged to convert the voltage output of the FV conversion circuit 7 from an analog signal into a digital signal. A microcomputer 9 (hereinafter referred to as the lens microcomputer) is arranged to preside over various control actions to be performed in the interchangeable lens 15. A motor unit 10 is arranged to drive the focusing lens unit 2. A driving circuit 11 is arranged to drive and control the motor unit 10. An encoder unit 12 is arranged to detect the rotational frequency and the amount of the driving action on the focusing lens unit 2. Function selection means 13 is disposed on the camera body 3 for the purpose of deciding the direction in which the focusing lens unit 2 is to be driven in relation to the rotating direction of the focus ring 1. A microcomputer 14 (hereinafter referred to as the camera microcomputer) is arranged to preside over various control actions to be performed in the camera body 3.

Figure 2:
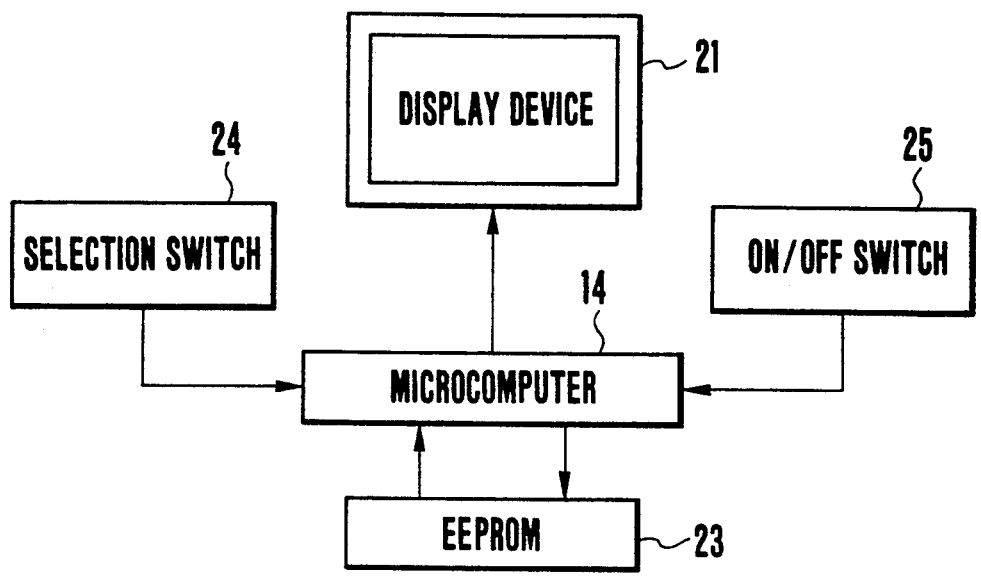
FIG. 2 shows in part an electrical arrangement on the side of the camera body of the camera of FIG. 1.

FIG. 2 shows an example of the means provided within the camera body 3 for deciding the direction in which the focusing lens unit 2 is to be driven in relation to the rotating direction of the focus ring 1. Referring to FIG. 2, a display device 21 is provided for allowing the operator to visually know the state of each of various control actions of the camera. A microcomputer 14 is arranged to preside over the various control actions of the camera. An EEPROM 23 is arranged to permit data writing therein for preventing data of the various control actions from being erased even when the power supply of the camera is cut off after the data is set for the control actions. A selection switch 24 is arranged to be used when each of the control actions is to be changed. An on/off switch 25 is arranged to be used for determining the data for the control actions.

Figure 3:
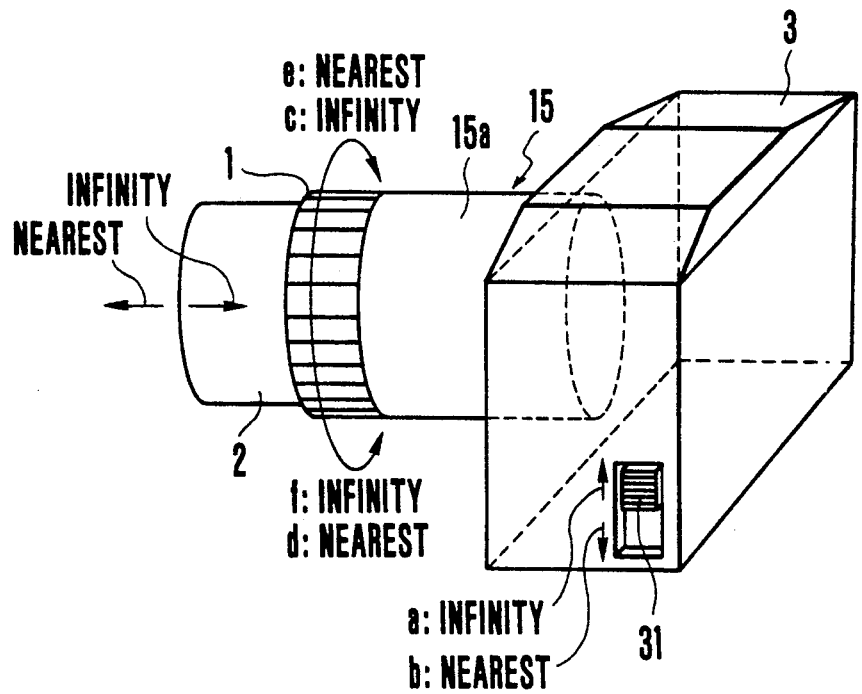
FIG. 3 shows the appearance of the same camera.

FIG. 3 is an oblique view of the camera of FIG. 1 showing the means for deciding the direction in which the focusing lens unit 2 is to be driven in relation to the rotating direction of the focus ring 1.

Referring to FIG. 3, the camera is provided with a selection switch 31 to enable the camera operator to determine the direction in which the focusing lens unit 2 is to be driven in relation to the direction in which the focus ring 1 is rotated. Reference numeral 2 denotes the focusing lens unit. Reference numeral 15a denotes a fixed lens barrel which is arranged as an exterior member of the interchangeable lens 15. Reference numeral 1 denotes the focus ring, and Reference numeral 3 denotes the camera body.

In a case where the selection switch 31 is set in a position "a" on the side of an infinity distance, the focusing lens unit 2 is moved toward an infinity distance position thereof when the focus ring 1 is rotated in the direction of arrow c, and toward a nearest distance position thereof when the focus ring 1 is rotated in the direction of arrow d. If the selection switch 31 is set in a position "b" on the side of a nearest distance, the focusing lens unit 2 is moved toward the nearest distance position when the focus ring 1 is rotated in the direction of arrow e, and toward the infinity distance position when the focus ring 1 is rotated in the direction of arrow f. In other words, the selection switch 31 serves as a means for deciding the direction in which the optical member is to be moved. In the case of FIG. 2, exactly the same action is performed by the function selection means 13 for deciding the driving direction of the focusing lens unit 2 in relation to the rotating direction of the focus ring 1, considering the function selecting means 13 as one of the functions of the camera in place of a physical switch.

Figure 4:
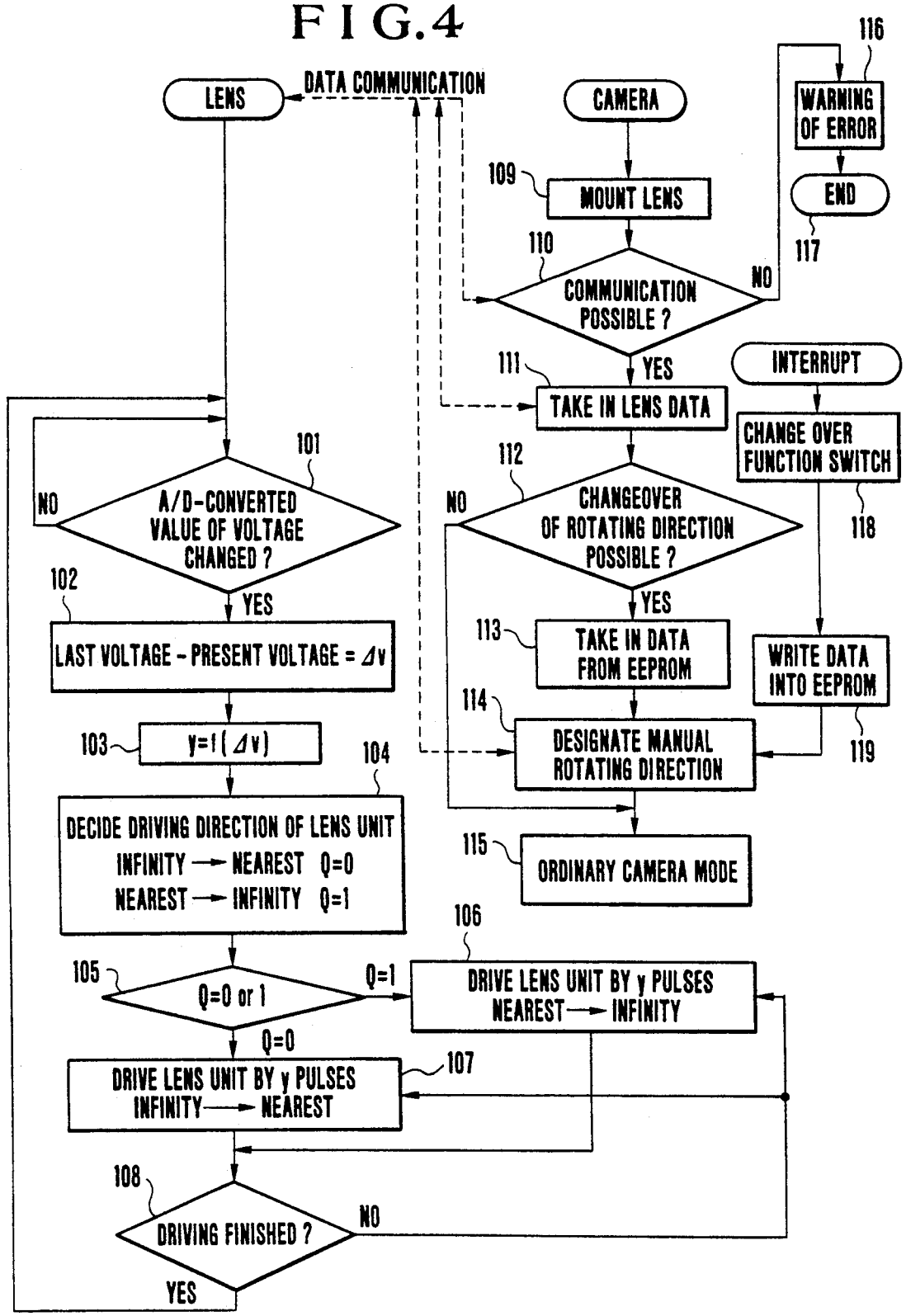
FIG. 4 is a flow chart showing the control operation of the camera shown in FIGS. 1, 2 and 3.

FIG. 4 is a flow chart showing the flow of operation in consideration of the function of each unit shown in FIGS. 2 and 3. Referring to FIG. 4, the operation to be performed by the camera of the embodiment is first described as follows:

At a step 109, the interchangeable lens 15 is mounted on the camera body 3. At a step 110, a check is made by the camera microcomputer 14 for confirming that the interchangeable lens 15 is perfectly mounted on the camera body 3. For this purpose, a preset command is sent via the contact unit 4 to the lens microcomputer 9 and a check is made for receipt from the lens microcomputer 9 some data that pertinently corresponds to the command sent. If no pertinent data is received from the lens microcomputer 9, the flow of operation comes to a step 116 to display a warning against an error. The flow then comes to a step 117 to have the interchangeable lens 15 remounted. If the communication between the lens and camera microcomputers 9 and 14 is found to be possible, the flow proceeds to a step 111. At the step 111, data for the intrinsic matters of the lens is taken into the camera microcomputer 14 through communication. At a next step 112, a check is made to find if the interchangeable lens 15 as mounted is of the kind permitting changeover of the relationship between the rotating direction of the focus ring 1 and the direction in which the focusing lens unit 2 is to be driven. If not, the flow of operation comes to a step 115 to have the camera operate as an ordinary camera system. If so, the flow comes to a step 113 to take in preset applicable data from the EEPROM 23. At a step 114, an instruction is given by communication to the lens microcomputer 9 to designate the manual rotating direction. The rest of the operation is performed in the same manner as an ordinary camera system.

Further, the interrupt processes of the camera microcomputer 14 include a process for changing the function of the camera. In the case of the interrupt, the camera is set in a function mode by operating the selection switch 24 and the current state of the camera is displayed by the display device 21. The flow then comes to a step 118. At the step 118, the on/off switch 25 is operated to decide the relationship between the rotating direction of the focus ring 1 and the direction in which the focusing lens unit 2 is to be driven. At a step 119, the camera microcomputer 14 writes the result of the decision into the EEPROM 23. The flow then comes to the step 114 to send the data to the lens microcomputer 9.

It is also possible, apart from the above-stated function, to instruct the lens microcomputer 9 by means of the physical switch 31.

Next, the operation of the interchangeable lens 15 is described as follows with reference to FIG. 4: when the focus ring 1 is rotated by hand, the FV conversion circuit 7 converts the output of the encoder 5 from a rotational frequency into a voltage. The voltage thus obtained is converted from an analog state to a digital value by the A/D conversion circuit 8. At a step 101, a check is made for any change of the voltage value by comparing the current voltage value with a voltage value obtained last time. If any change is found, the flow comes to a step 102. At the step 102, a difference between the previous voltage data of the A/D conversion circuit 8 and the current voltage data of the A/D conversion circuit 8 is obtained. The difference is set as $\Delta V$.

At a step 103, the difference value $\Delta V$ is substituted for a function "f" to convert it into a driving pulse value "y" to be used for driving the focusing lens unit 2. At a step 104, the direction in which the focus ring 1 is rotated is detected through the output of the rotating direction detecting circuit 6. Then, the camera microcomputer 14 sets the direction in which the focusing lens unit is to be driven relative to the rotating direction of the focus ring 1 and sends, through the communication via the contact unit 4, focusing-lens driving data to the lens microcomputer 9. Upon receipt of the driving direction data, the lens microcomputer 9 decides, on the basis of the data, the direction in which the focusing lens unit 2 is to be driven. At a step 106 or 107, after the driving direction is decided, the driving circuit 11 is driven by the driving pulse value "y" to cause the motor 10 to move the focusing lens unit 2 in the direction from an infinity distance position toward a nearest distance position or from the nearest distance position to the infinity distance position. At a step 108, the output of the encoder 12 is checked to find if the driving process has come to an end. If so, the flow comes back to the beginning of the flow to cause the A/D conversion circuit 8 to resume the A/D converting action thereof.

EMBODIMENT 2

While power focusing has been described in the description of the first embodiment, power zooming can be similarly carried out as apparent from the following description of a second embodiment of this invention.

Figure 5:
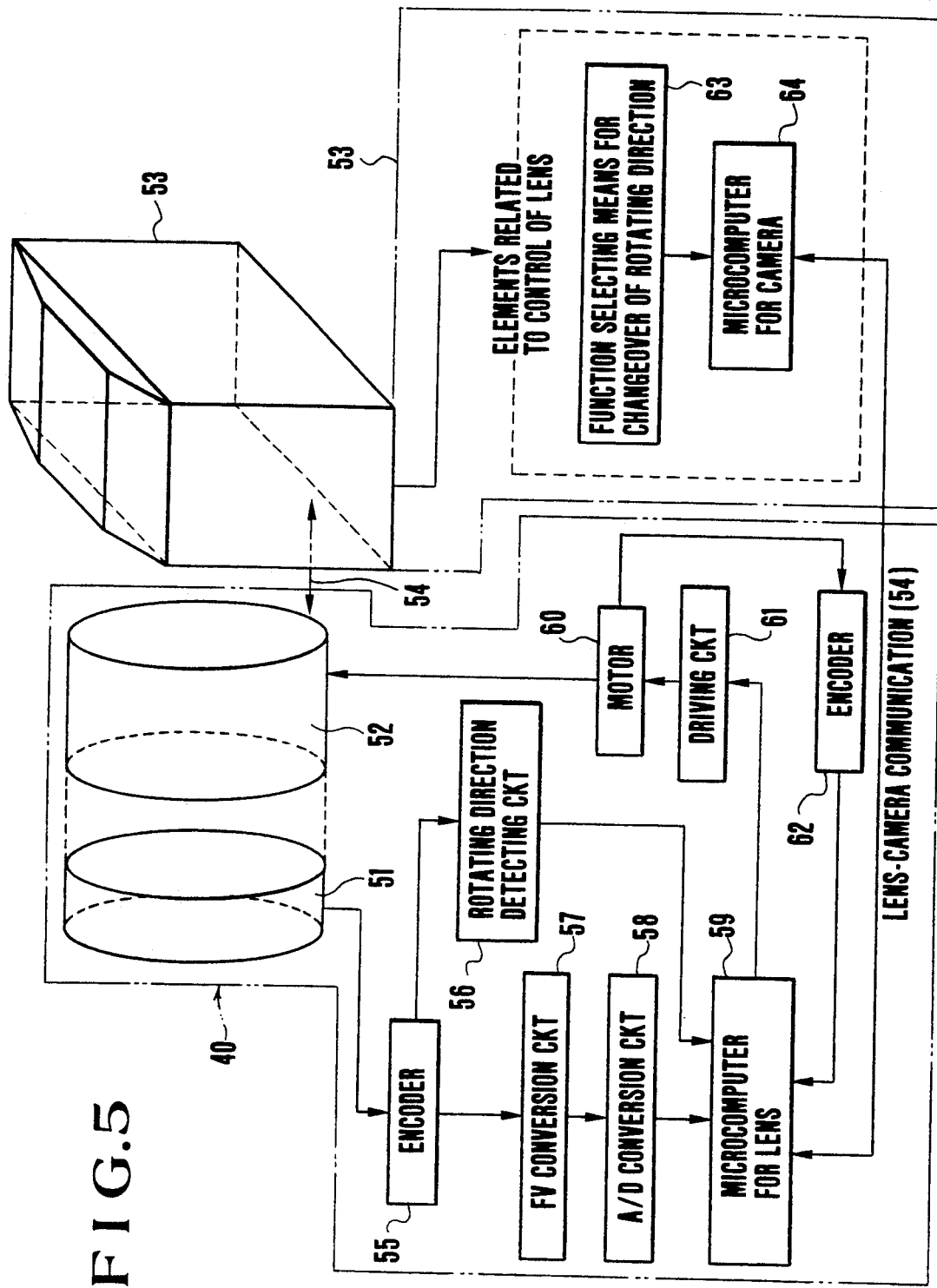
FIG. 5 shows in outline the essential parts of a single-lens reflex camera arranged according to this invention as a second embodiment thereof.

FIG. 5 shows the second embodiment of this invention. The illustration includes an interchangeable lens 40, a zoom ring 51 which is provided for designating a ratio of magnifying power for manual zooming, a zooming lens unit 52, a camera body 53, a contact unit 54 which is provided for communication between the camera body 53 and the interchangeable lens 40, an encoder unit 55 which is provided for detecting the rotational frequency and the rotating direction of the zoom ring 51 when the zoom ring 51 is rotated, a rotating direction detecting circuit 56 which is arranged to convert the output signal of the encoder unit 55 into the rotating direction and to electrically detect the rotating direction of the zoom ring 51 when the zoom ring 51 is rotated, an FV conversion circuit 57 which is arranged to convert the output signal of the encoder unit 55 from the rotational frequency into a voltage when the zoom ring 51 is rotated, an A/D conversion circuit 58 which is arranged to convert the output voltage of the FV conversion circuit 57 from an analog signal to a digital signal, a lens microcomputer 59 which is arranged to preside over various lens control actions, a motor unit 60 which is arranged to drive the zooming lens unit 52, a driving circuit 61 which is arranged to drive and control the motor unit 60, an encoder unit 62 which is arranged to detect the driving rotational frequency and the driven amount of the zooming lens unit 52, selection means 63 which is provided on the camera body 53 for deciding the driving direction of the zooming lens unit 52 in relation to the rotating direction of the zoom ring 51, and a camera microcomputer 64 which is arranged to preside over various control actions to be performed on the side of the camera body.

The method for changing the direction in which zooming lens unit 52 is to be driven in relation to the rotating direction of the zoom ring 51 from one direction over to the other and the flow of operation to be executed when the zoom ring 51 is rotated are similar to those of the power focusing arrangement of the first embodiment and are, therefore, omitted from description.

EMBODIMENT 3

Figure 6:
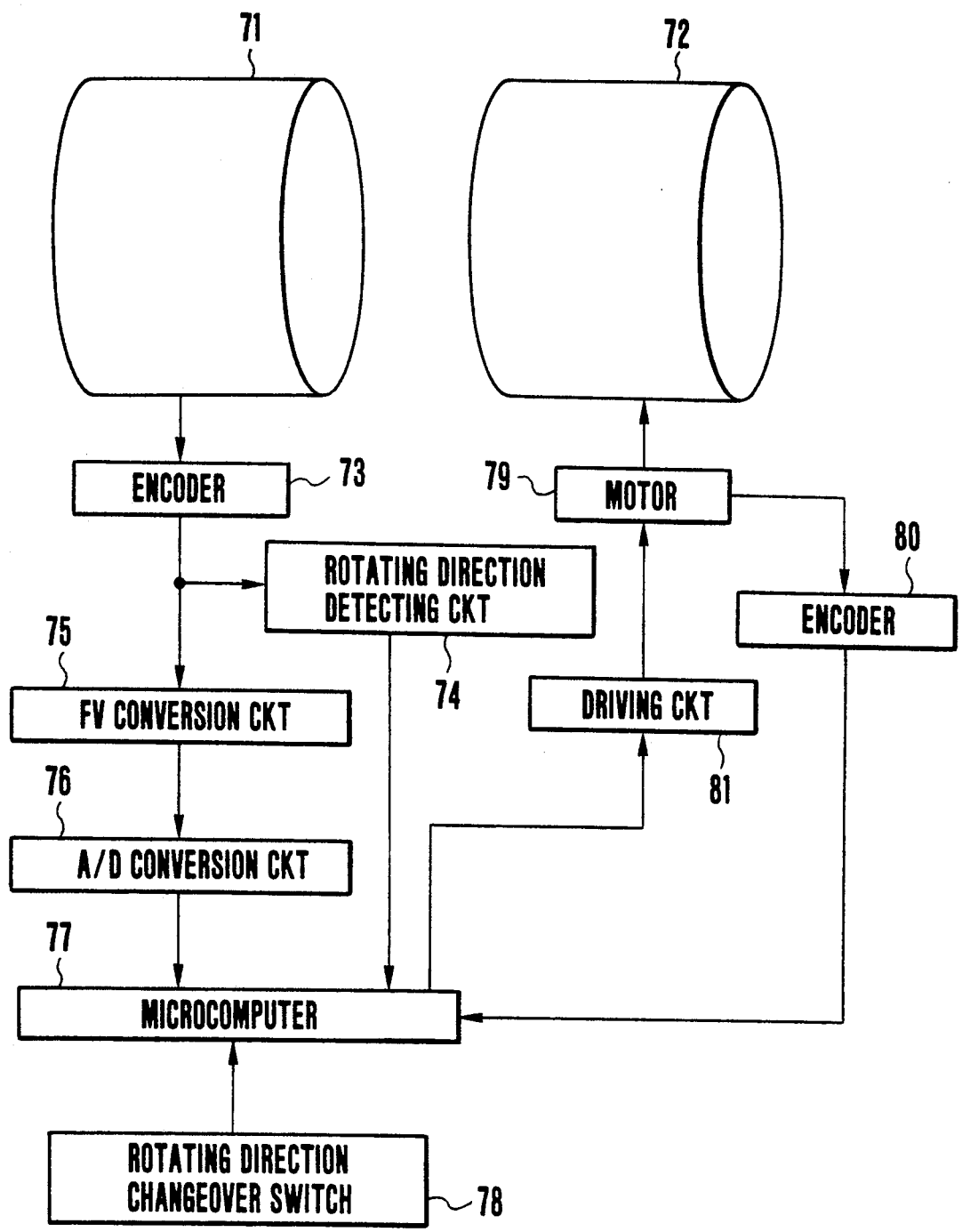
FIG. 6 shows in outline the essential parts of an interchangeable lens for a single-lens reflex camera arranged as a third embodiment of this invention.

FIG. 6 shows an interchangeable lens which is arranged as a third embodiment of this invention to be used for a power focusing type single-lens reflex camera.

Referring to FIG. 6, the illustration includes a focus ring 71 which is provided for obtaining an in-focus state by manual focusing, a focusing lens unit 72, an encoder unit 73 for detecting a rotational frequency when the focus ring 71 is rotated, a rotating direction detecting circuit 74 for detecting the rotating direction of the focus ring 71 when the focus ring 71 is rotated, an Fv conversion circuit 75 for converting the output signal of the encoder unit 73 for the focus ring 71 from the rotational frequency to a voltage, an A/D conversion circuit 76 for converting the output voltage of the FV conversion circuit 75 from an analog signal to a digital signal, a lens microcomputer 77 which is arranged to preside over various control actions, a switch 78 which is provided for selection of the direction in which the focusing lens unit 72 is to be driven and moved in relation to the direction in which the focus ring 71 is rotated, a motor unit 79 for driving the focusing lens unit 72, an encoder unit 80 for detecting the rotational frequency and the driven amount of the focusing lens unit 72, and a driving circuit 81 which is arranged to drive and control the motor unit 79.

Figure 7:
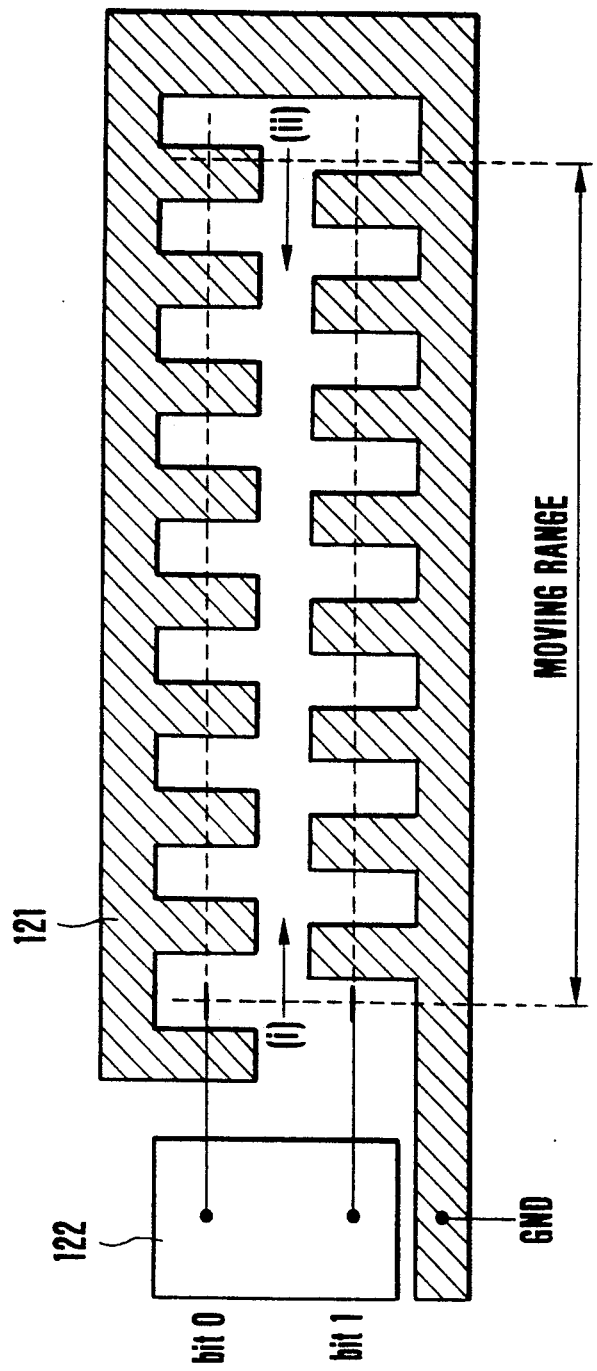
FIG. 7 shows in outline the arrangement of an encoder for the interchangeable lens shown in FIG. 6.

FIG. 7 shows the arrangement of each of the encoder units 73 and 80 shown in FIG. 6. Referring to FIG. 7, a metal pattern 121 is charged with zero voltage. A brush unit 122 has two metal brushes mounted thereon and is arranged to obtain signals bit0 and bit1 for obtaining a moving speed and a moving amount by sliding over the surface of the metal pattern 121.

Figure 8:
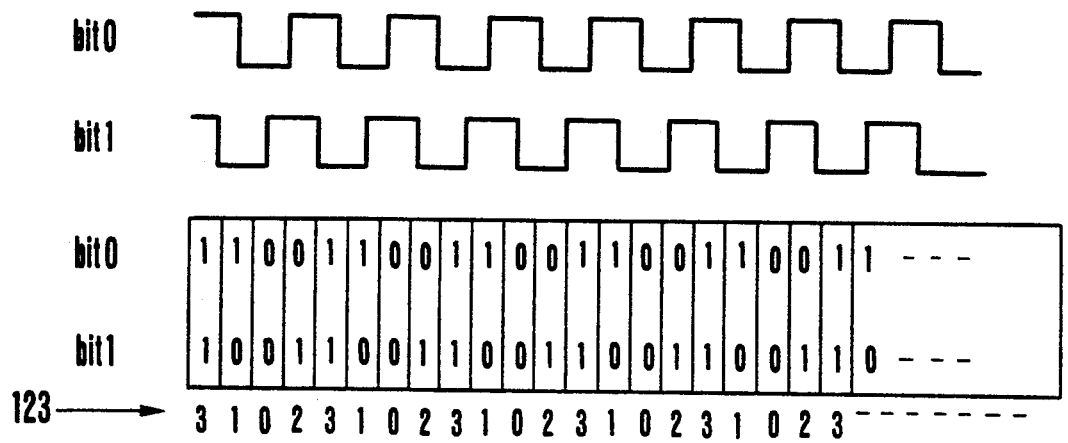
FIGS. 8 and 9 show the function of the encoder which is arranged as shown in FIG. 7.

FIG. 8 shows changes taking place with time in the signals bit0 and bit1 when the brush unit 122 moves over the pattern 121 in the direction of arrow (i). In FIG. 8, a part 123 shows the binary digits of the signals bit0 and bit1 in decimal numbers in such a way as to permit recognition of the rotating direction of the focus ring 71 by the repetition of 3 - 1 - 0 - 2 - 3 ---.

Figure 9:
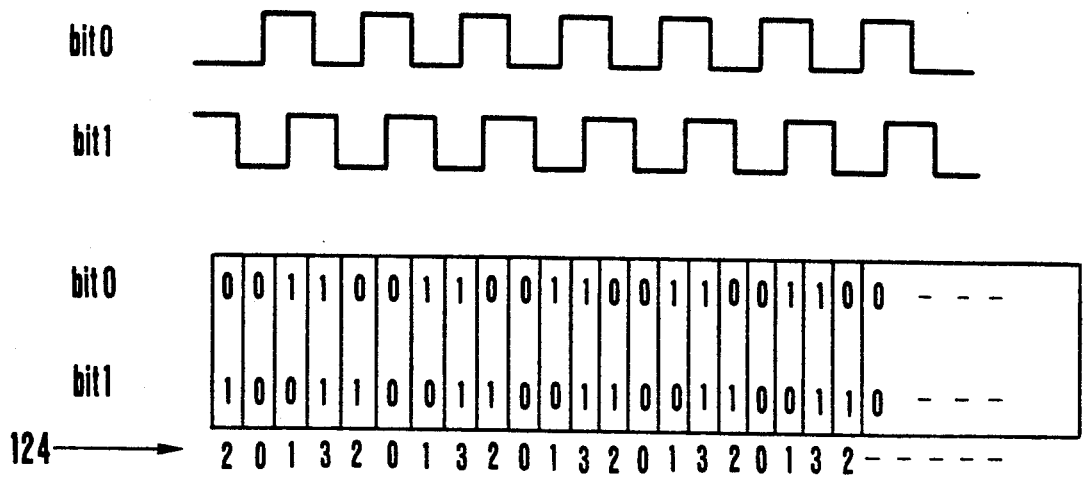

FIG. 9 shows changes taking place with time in the signals bit0 and bit1 when the brush unit 122 moves over the pattern 121 in the direction of arrow (ii). In FIG. 9, a part 124 shows the binary digits of the signals bit0 and bit1 also in decimal numbers in such a way as to permit recognition of the rotating direction of the focus ring 71 by the repetition of 2 - 0 - 1 - 3 - 2 ---.

EMBODIMENT 4

Figure 10:
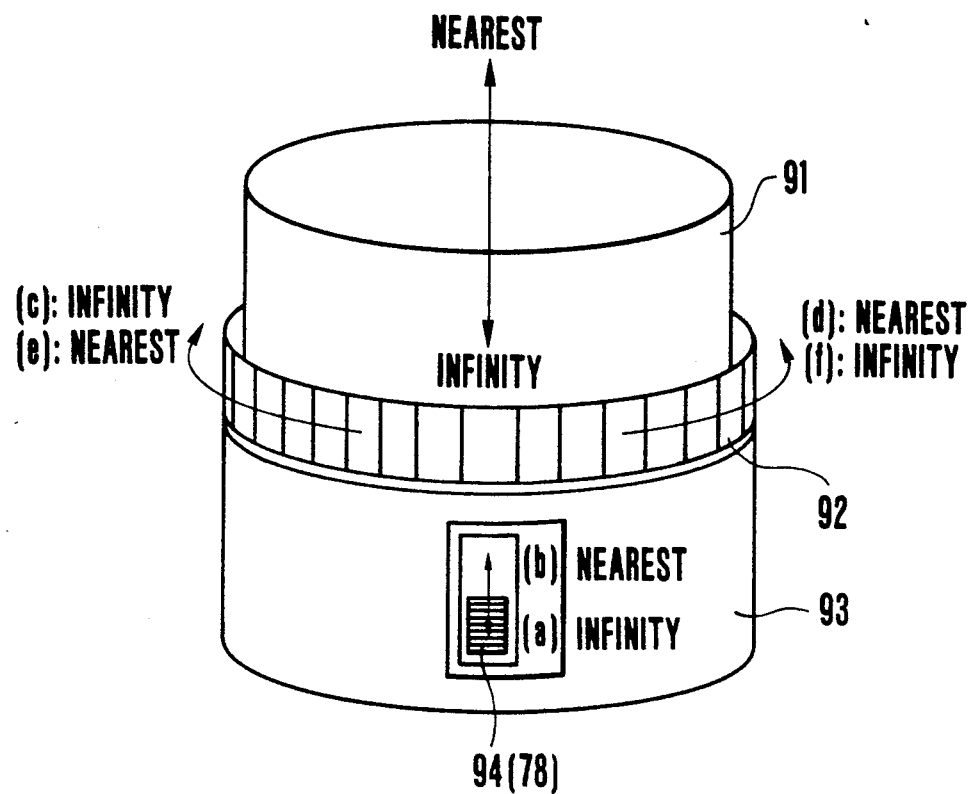
FIG. 10 is an oblique view of an interchangeable lens for a single-lens reflex camera which is arranged as a fourth embodiment of this invention.

FIG. 10 shows an interchangeable lens arranged as a fourth embodiment of this invention. The illustration includes a focusing lens unit 91, a focus ring 92, a fixed lens barrel 93, and a changeover switch 94 for switching the direction in which the focusing lens unit 91 is to be driven in relation to the rotating direction of the focus ring 92 from one direction over to the other. In the case of the interchangeable lens of this (fourth) embodiment, the changeover switch 94 is arranged as follows: with the switch 94 set in a position on the side of infinity distance (a), the focusing lens unit 91 moves toward an infinity distance position thereof when the focus ring 92 is rotated in the direction of arrow (c) and toward a nearest distance position thereof when the focus ring 92 is rotated in the direction of arrow (d). In a case where the changeover switch 94 is set on the nearest distance side (b), the focusing lens unit 91 moves toward the nearest distance position when the focus ring 92 is rotated in the direction of arrow (e) and toward the infinity distance position when the focus ring 92 is rotated in the direction of arrow (f).

EMBODIMENT 5

Figure 11:
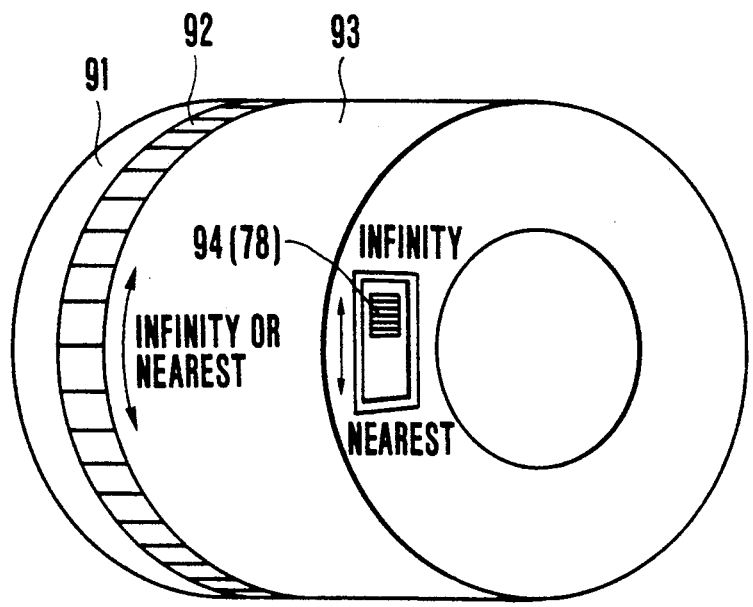
FIG. 11 is an oblique view of an interchangeable lens for a single-lens reflex camera which is arranged as a fifth embodiment of this invention.

FIG. 11 shows an interchangeable lens arranged as a fifth embodiment of this invention. The changeover switch 94 mentioned above is not often operated when once the rotating direction is set. In view of this, in the case of the fifth embodiment, the changeover switch 94 is disposed on one end face on the mount side of the lens for improvement in the external design of the lens and also for preventing it from being inadvertently operated. With the exception of this point, the fifth embodiment is arranged and operates in the same manner as the fourth embodiment which is shown in FIG. 10.

Figure 12:
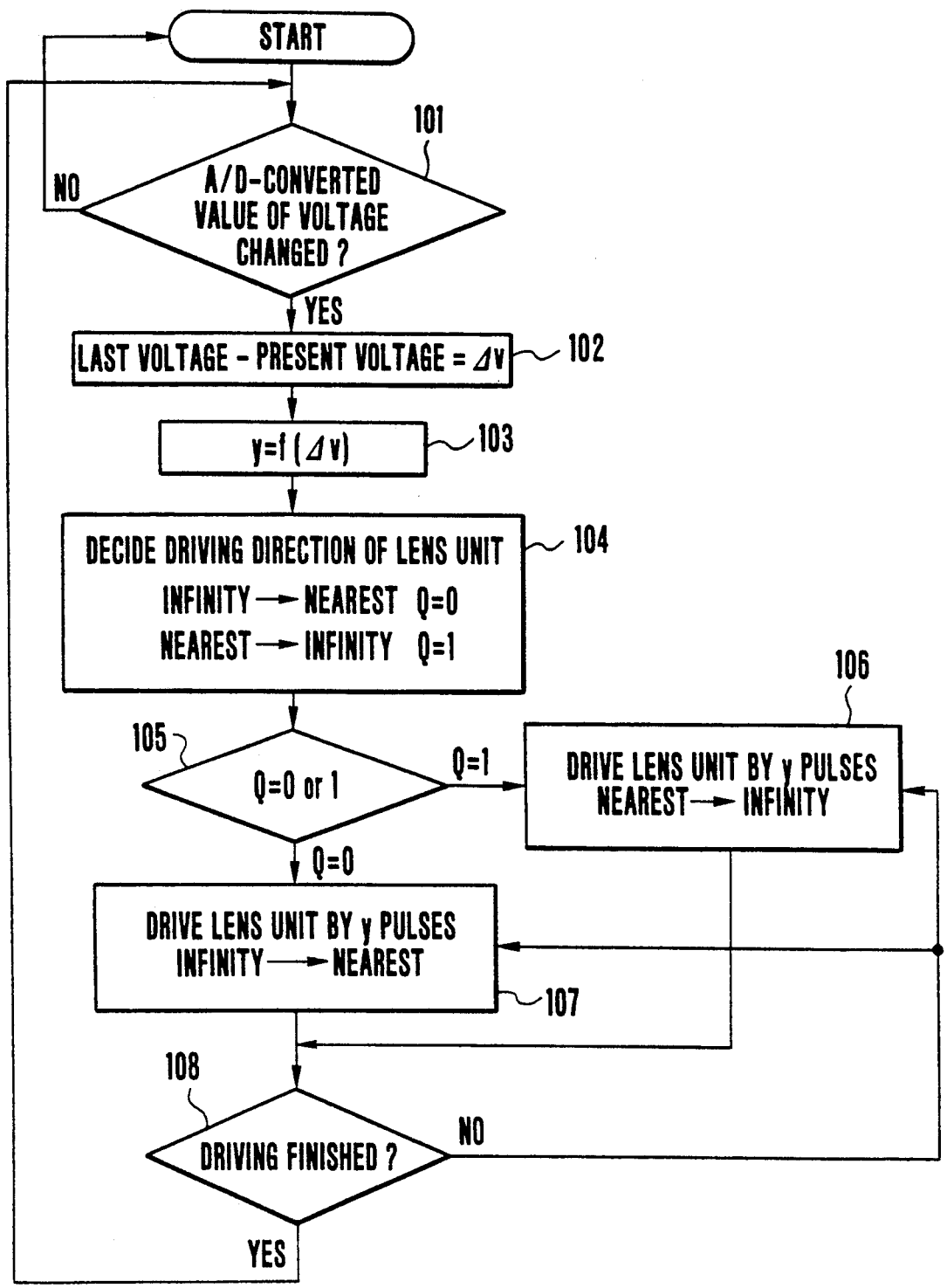
FIG. 12 is a flow chart showing the operation of the interchangeable lens shown in FIG. 6.

FIG. 12 is a flow chart showing the operation of the interchangeable lens arranged as the third embodiment as shown in FIG. 6. The flow of operation is described with reference to FIG. 12 as follows: when the focus ring 71 is rotated, the output of the encoder unit 73 is FV (frequency-to-voltage) converted. A voltage value thus obtained is A/D (analog-to-digital) converted. At a step 101, a check is made for any change in the digital voltage value by comparing the currently obtained data of the voltage value with the previously obtained data of the voltage value. If the voltage value is thus found to have changed, the flow comes to a step 102. At the step 102, a difference between the current A/D converted voltage data and the previously A/D converted voltage data is obtained as a difference value ΔV. At a step 103, the difference value ΔV is substituted for a function "f" and is thus converted into a driving pulse value "y" by which the focusing lens unit 72 is to be driven. At a next step 104, the direction in which the focus ring 71 is rotated is detected from the output of the rotating direction detecting circuit 74. Then, the direction in which the focusing lens unit 72 is to be driven is decided according to the output of the rotating direction changeover switch 78. At a step 105, a check is made for the "infinity to nearest" or "nearest to infinity" driving direction. The flow comes to a step 106 or to a step 107 according to the result of the check. At the step 106 or 107, the lens unit is driven as much as the driving pulse value "y" through the driving circuit 81 and the motor unit 79 in the applicable direction. At a step 108, the output of the encoder unit 80 is checked for the end of the lens unit driving action. When the driving action comes to an end, the flow of operation comes back to its beginning to cause the A/D conversion circuit 76 to begin its A/D conversion.

EMBODIMENT 6

While the interchangeable lens having the power focusing device has been described in the description of the fourth embodiment, this invention is of course applicable also to an interchangeable lens having a power zooming device. In the case of a sixth embodiment shown in FIG. 13, the invention is applied to an interchangeable lens having a power zooming device.

Figure 13:
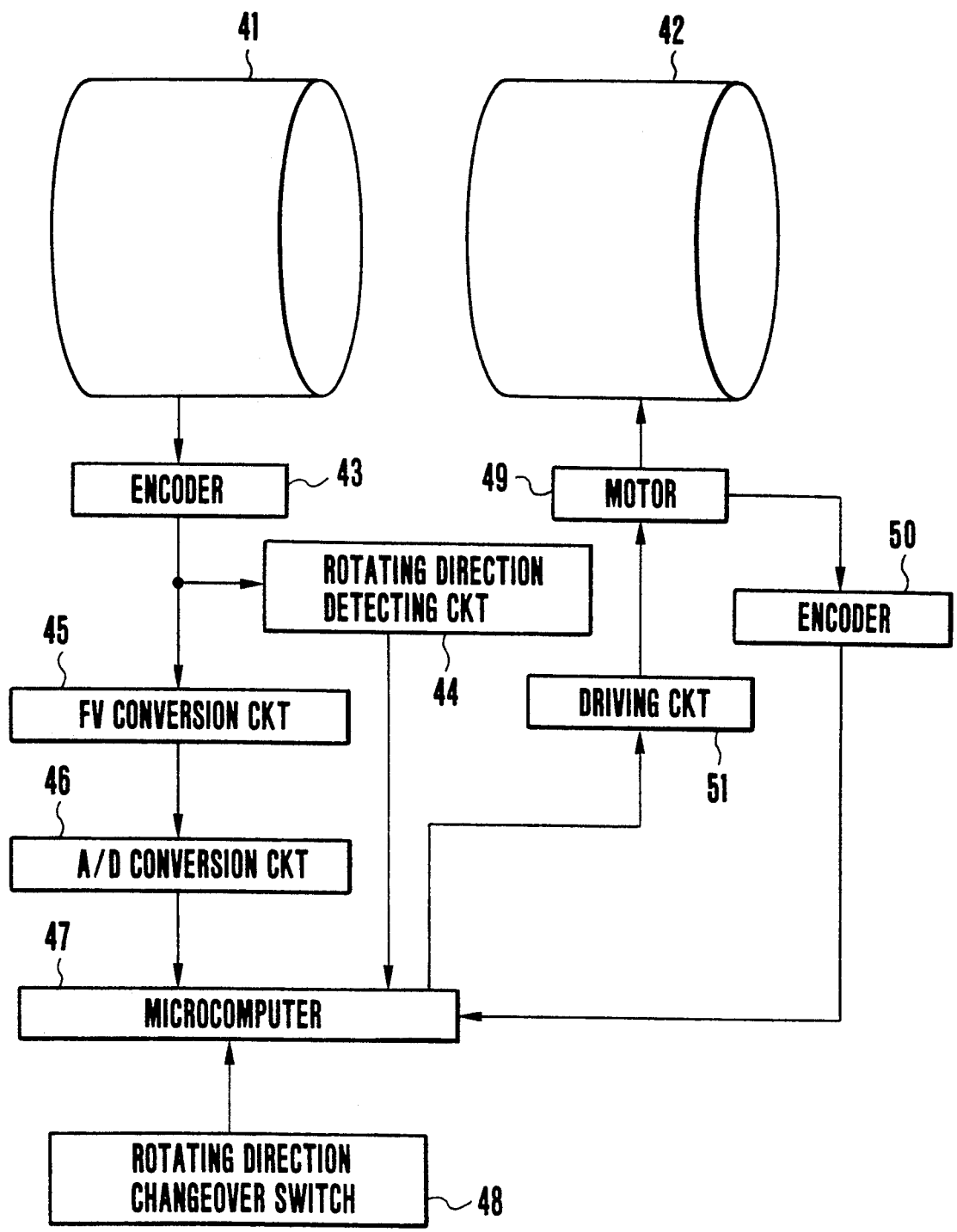
FIG. 13 shows in outline an interchangeable lens arranged as a sixth embodiment of this invention.

Referring to FIG. 13, the illustration includes a zoom ring 41 which is provided for giving an instruction designating a ratio of magnifying power, a zooming lens unit 42, an encoder unit 43 for detecting a rotational frequency obtained when the zoom ring 41 is operated to rotate, a rotating direction detecting circuit 44 for detecting the rotating direction when the zoom ring 41 is rotated, an FV conversion circuit 45 which is arranged to convert the output signal of the encoder unit 43 for the zoom ring 41 from a rotational frequency to a voltage, an A/D conversion circuit 46 which is arranged to convert the output voltage of the FV conversion circuit 45 from an analog signal to a digital signal, a microcomputer (or lens microcomputer) 47 which is arranged to preside over various control actions, a switch 48 to be used in selecting the direction in which the zooming lens unit 42 is to be driven in relation to the rotating direction of the zoom ring 41, a motor unit 49 for driving the zooming lens unit 42, an encoder unit 50 for detecting the rotational frequency and the driven amount of the zooming lens unit 42, and a driving circuit 51 for driving the motor unit 49. A method for detecting the rotating direction of the zoom ring 41, a method for changing the driving direction of the zooming lens unit 42 relative to the rotating direction of the zoom ring 41 from one direction over to the other, and the flow of operation of the sixth embodiment are similar to those of the power focusing device of the fourth embodiment. Therefore, these methods and the flow of operation are omitted from description.

The optical apparatus arranged according to this invention, as described above, is provided with a lens moving direction deciding means by which the predetermined lens moving direction relative to the rotating direction of the rotary operation member can be changed as necessary. The provision of the lens moving direction deciding means enables the camera operator to easily change the relationship between the rotating direction of the rotary operation member and the lens moving direction, so that optical apparatuses manufactured by different manufacturing companies can be unerringly operated.

EMBODIMENT 7

Figure 14:
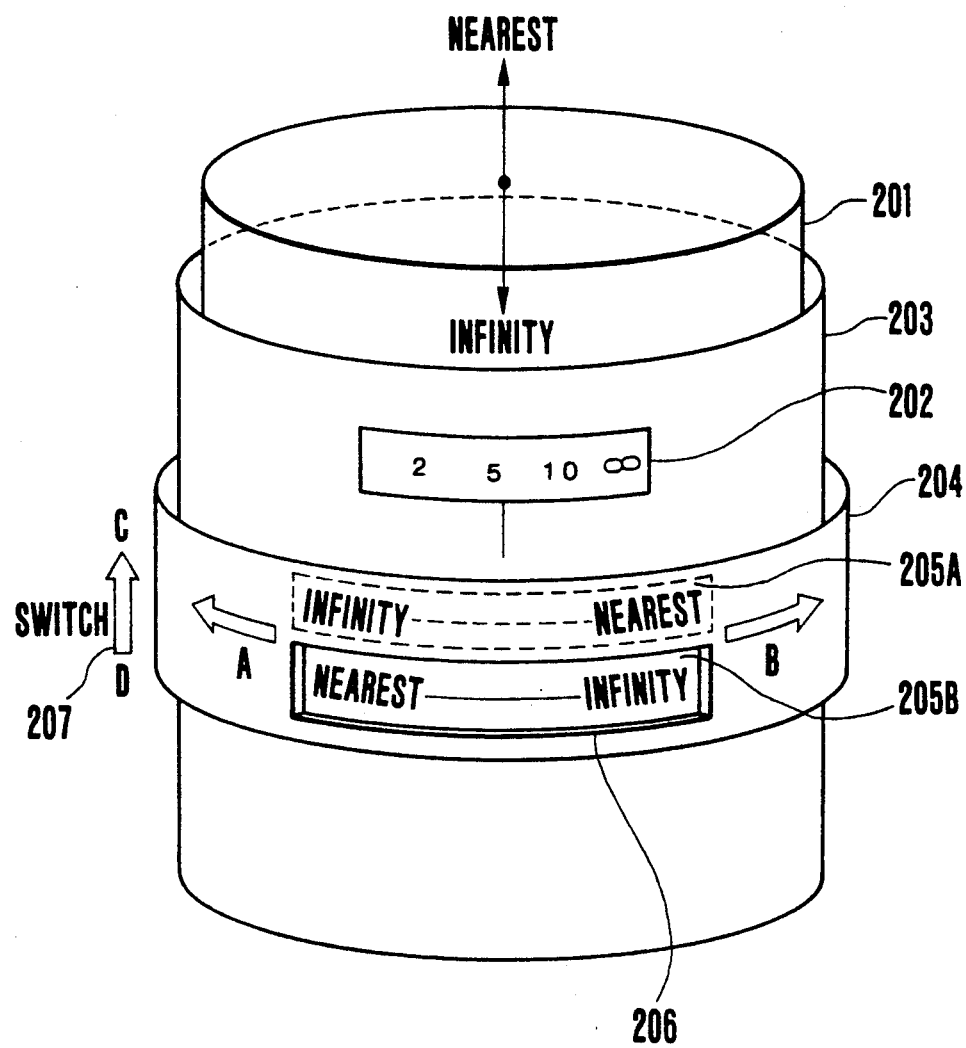
FIG. 14 shows in outline an optical apparatus arranged as a seventh embodiment of this invention.
Figure 15:
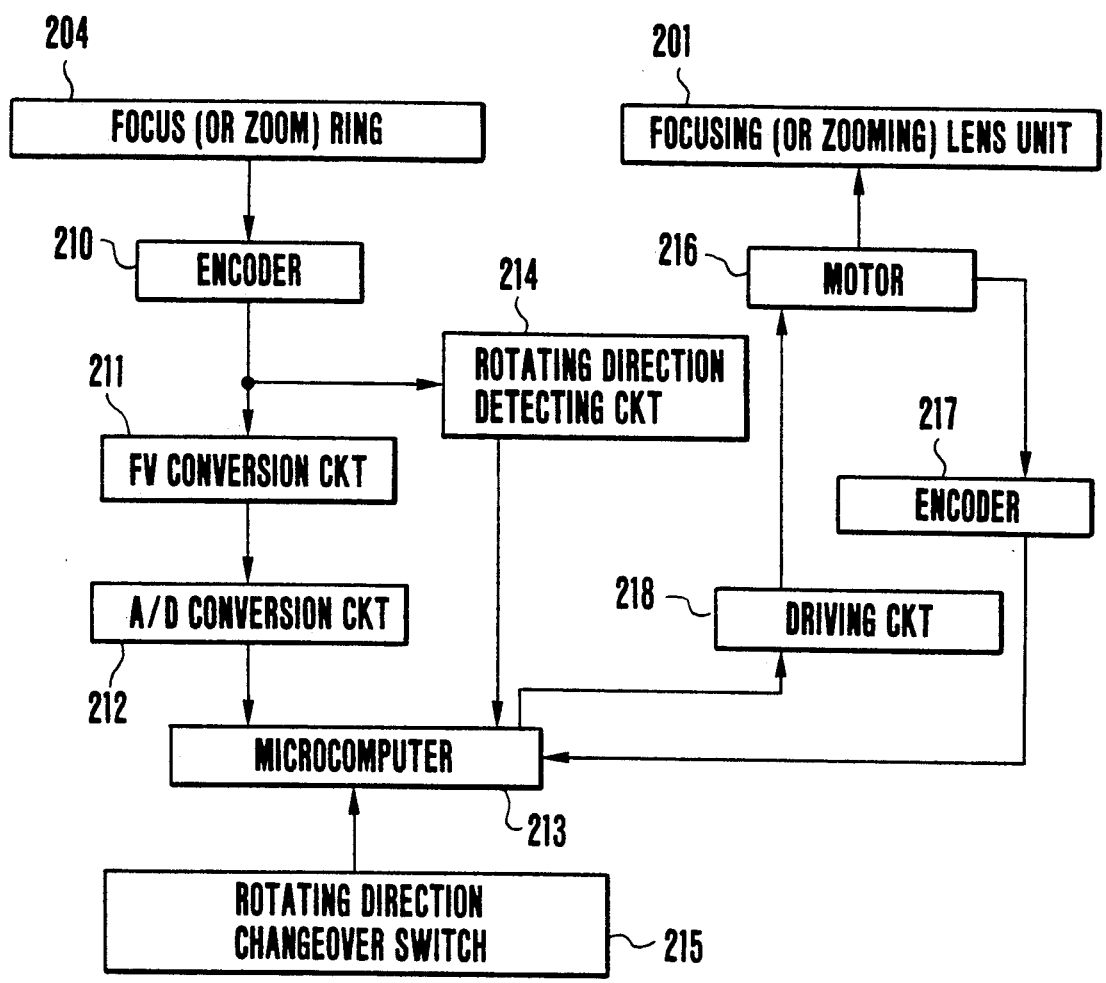
FIG. 15 is a block diagram showing in outline the system arrangement of the seventh embodiment.
Figure 16:
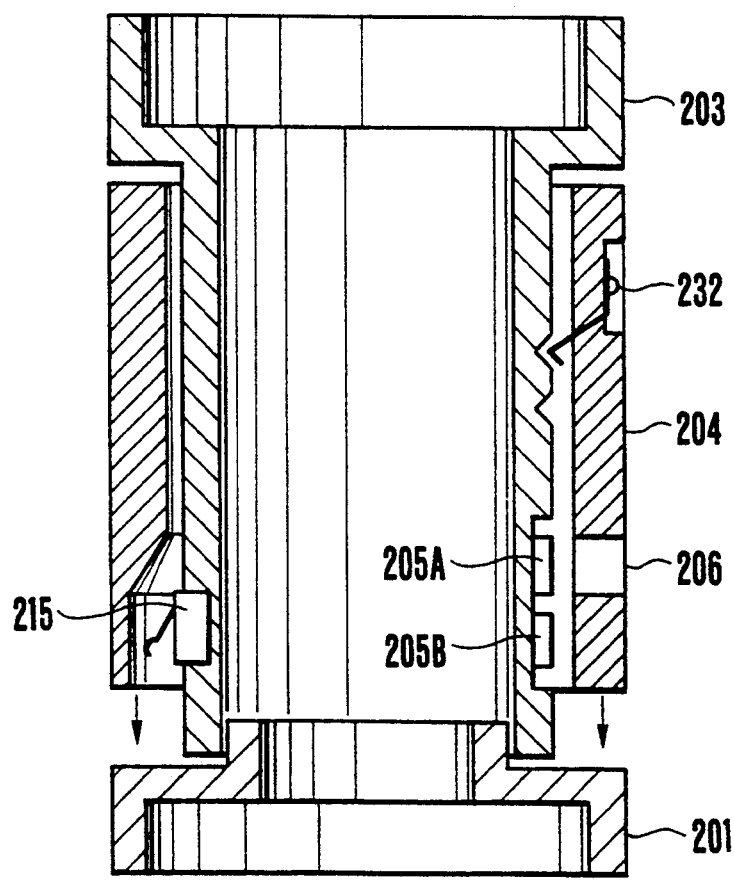
FIG. 16 is a sectional view of FIG. 14.

FIGS. 14, 15 and 16 show an optical apparatus arranged as a seventh embodiment of this invention. The seventh embodiment is arranged as described below with reference to these figures:

Referring to these figures, a focusing lens unit 201 (hereinafter referred to as the lens unit) is arranged to be used for focusing. A distance indication 202 is printed on the lens unit 201. A lens body 203 is a fixed part of the lens. A focus ring 204 is provided for giving an instruction designating the direction and the amount of a driving action on the lens unit 201. The focus ring 204 is arranged not only to be rotatable for focusing but also to be movable in the direction of arrow 207 along an optical axis, in such a way as to be used as a direction changeover switch.

A first direction indicating part 205A indicates the direction in which the lens unit 201 is to be moved in relation to a rotating direction mark provided by printing or the like on the front part of the lens body 203. A second direction indicating part 205B indicates the direction in which the lens unit 201 is to be moved in relation to a rotating direction mark provided by printing or the like in parallel to and in the rear of the first direction indicating part 205A. These direction indicating parts 205A and 205B have opposite indications with respect to the rotating direction.

A display window 206 is formed by cutting out a part of the focus ring 204 in such a way as to make the direction indicating part 205A or 205B selectively visible from outside. In a state as shown in FIG. 14, the second direction indicating part 205B is visible. The first direction indicating part 205A becomes visible when the focus ring 204 is slid forward. In other words, when the focus ring 204 is set on one side C by sliding it in parallel to the optical axis of the lens, the direction in which the lens unit 201 is to be moved in relation to the rotating direction of the focus ring 204 is displayed in the display window 206. Then, the lens unit 201 is driven to move toward an infinity distance position when the focus ring 204 is rotated in the direction of arrow A and to move toward a nearest distance position when the focus ring 204 is rotated in the direction of arrow B. Further, when the focus ring 204 is set on the other side D, the direction in which the lens unit 201 is to be moved in relation to the rotating direction of the focus ring 204 is displayed in the display window 206 in a manner reverse to the moving direction displayed with the focus ring set on the side C. Under this condition, the lens unit 201 is driven to move toward a nearest distance position when the focus ring 204 is rotated in the direction of arrow A and to move toward an infinity distance position when the focus ring 204 is rotated in the direction of arrow B.

In moving the focus ring 204 back and forth for the changeover of the direction, a focus-ring movable range is limited by a stopper 232. The relationship between the direction in which the lens unit 201 is moved and the direction in which the focus ring 204 is rotated is determined by means of a switch 215.

In accordance with the above-stated arrangement of this embodiment, the visible display in the display window 206 changes from the direction indicating part 205A over to the other direction indicating part 205B and vice versa with the focus ring 204 slid in the direction of the optical axis. When the focus ring 204 is rotated in accordance with the direction displayed in the display window 206, the lens unit 201 is driven in the correct direction in relation to the focus-ring rotating direction. Therefore, a manual focusing operation can be unerringly performed by the camera operator.

FIG. 15 shows in a block diagram the system arrangement of the seventh embodiment. Referring to FIG. 15, the lens unit 201 is provided for focus adjustment. The focus ring 204 is provided for giving an instruction designating the direction and amount of a driving action to be performed on the lens unit 201. An encoder 210 is provided for detecting the rotating amount and the rotating direction of the focus ring 204 when the focus ring 204 is rotated. An FV conversion circuit 211 is arranged to convert the speed output of the encoder 210 into a voltage. An A/D conversion circuit 212 is arranged to convert the output voltage of the FV conversion circuit 211 into a digital output. A microcomputer 213 is arranged to preside over various lens control actions. A rotating direction detecting circuit 214 is arranged to detect the rotating direction through the output of the encoder 210. A rotating direction changeover switch 215 is provided for deciding the driving direction of the lens unit 201 by moving the focus ring 204 in parallel to the optical axis of the lens unit 201. A motor unit 216 is arranged to drive the lens unit 201. An encoder 217 is arranged to detect the amount and speed of the rotation of the motor unit 216. A driving circuit 218 is arranged to drive the motor unit 216.

Figure 18:
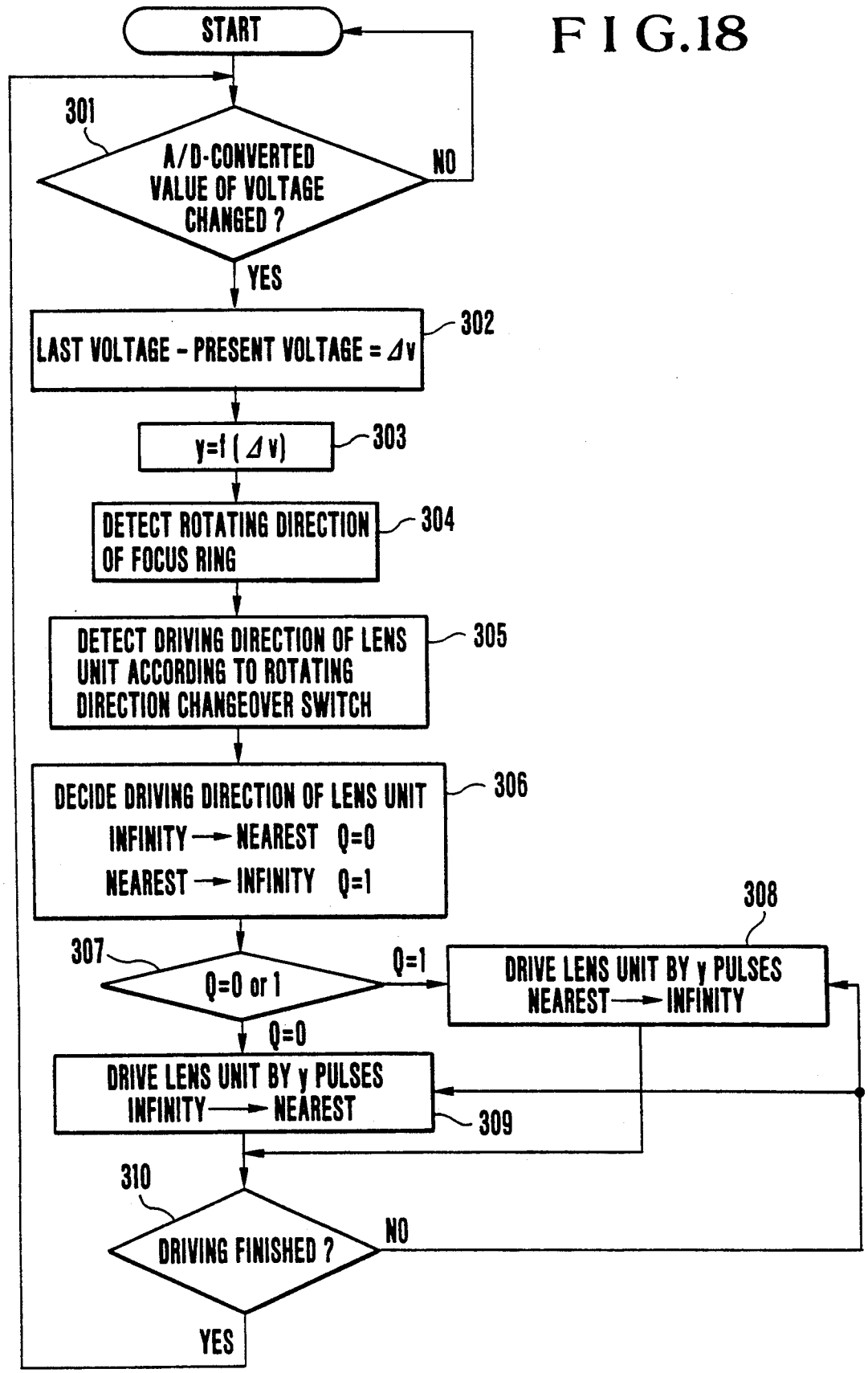
FIG. 18 is a flow chart showing the operation of the system shown in FIG. 15.

FIG. 18 is a flow chart showing the function of each of the units shown in the block diagram of FIG. 15. Referring to FIG. 18, the flow of operation of the seventh embodiment is described as follows: when the focus ring 204 is rotated, the encoder 210 which is connected directly to the focus ring 204 rotates at the same time. The output of the encoder 210 is distributed to the FV conversion circuit 211 and the rotating direction detecting circuit 214. The FV conversion circuit 211 then converts the frequency output of the encoder 210 into a voltage output. The voltage output of the FV conversion circuit 211 is sent to the A/D conversion circuit 212 to be converted into a digital output, which is then sent to the microcomputer 213. At a step 301 of the flow chart, the microcomputer 213 makes a check for a change in the output of the A/D conversion circuit 212. If any change is thus detected, the flow of operation comes to a step 302. At the step 302, a difference or a ratio between the current voltage output and the previous voltage output is computed instantly to obtain a difference value $\Delta V$. At a step 303, an arithmetic operation is performed on the difference value $\Delta V$ with a certain function "f" to derive a driving amount "y" of the lens unit 201. At a step 304, the rotating direction detecting circuit 214 detects the rotating direction of the focus ring 204. At a step 305, the driving direction of the lens unit 201 is detected through the rotating direction changeover switch 215. At a step 306, the direction in which the lens unit 201 is to be driven is decided on the basis of the position of the switch 215.

At a step 307, a check is made for the direction in which the lens unit 201 is to be driven. At a step 308 or 309, the driving circuit 218 is caused to drive the lens unit 201 as much as the driving amount "y" through the motor 216. When the motor 216 rotates, the encoder 217 also rotates at the same time and sends information on the actual driving amount to the microcomputer 213. The microcomputer 213 compares the actual driving amount with the driving amount "y". At a step 310, the driving action is terminated when these amounts become equal. Upon completion of driving, the flow comes back to the start of the flow of operation.

When the position of the rotating direction changeover switch 215 changes, the driving direction of the lens unit 201 also changes either to the direction from an infinity distance position to a nearest distance position or to the direction from a nearest distance position to an infinity distance position.

EMBODIMENT 8

While the arrangement for changeover of the lens-unit driving direction for focusing has been described in the description of the seventh embodiment, an eighth embodiment of the invention is arranged to make the changeover of the lens-unit driving direction for zooming. The changeover for zooming can be carried out in the same manner as the changeover for focusing.

Figure 17:
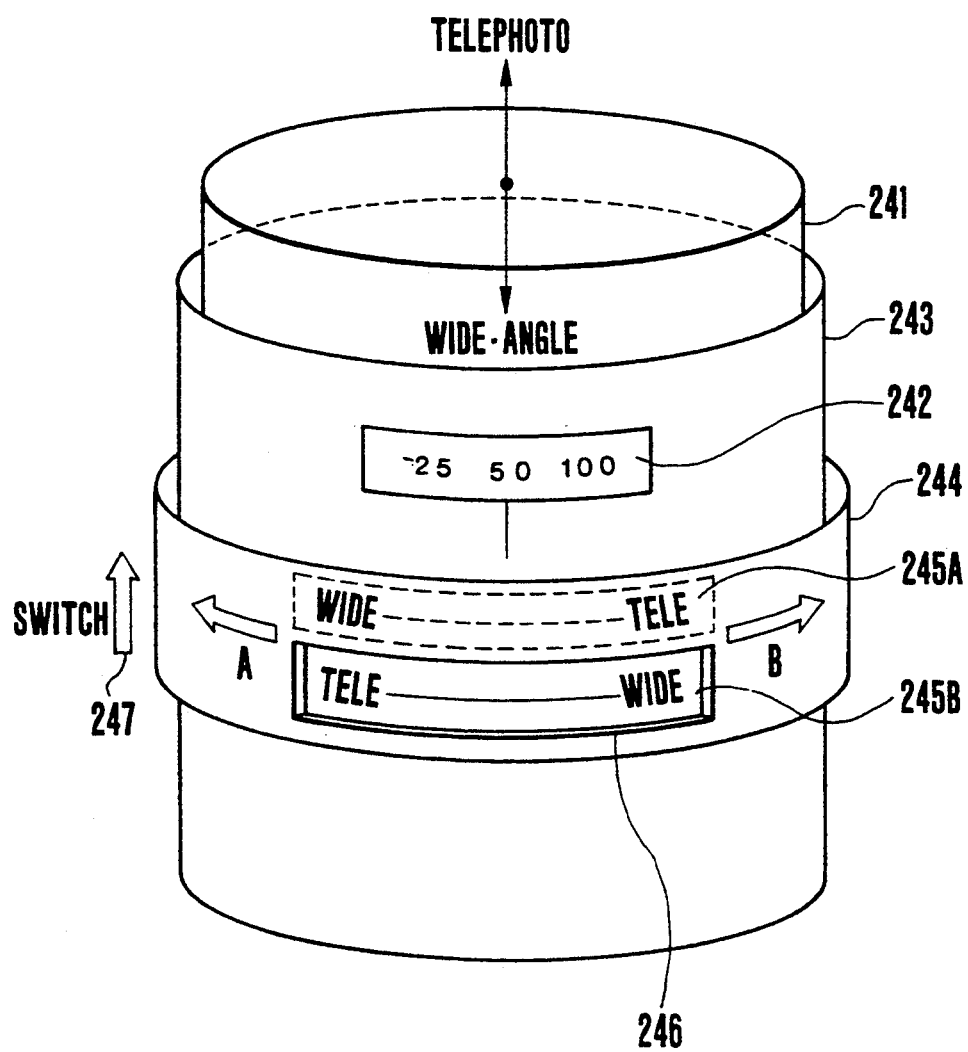
FIG. 17 shows in outline an optical apparatus arranged as an eighth embodiment of this invention.

FIG. 17 shows the eighth embodiment. Referring to FIG. 17, a zooming lens unit 241 is arranged to change the ratio of magnifying power. A focal length indication 242 is provided by printing or the like for showing focal lengths. A lens body 243 is arranged to be stationary. A zoom ring 244 is provided for giving an instruction designating the direction and the amount of a driving action on the zooming lens unit 241. Direction indicating parts 245A and 245B are arranged to show respectively the moving directions of the zooming lens unit 241 in relation to the zoom-ring rotating direction indicated by printing or the like on the lens body 243. The indications made by these direction indicating parts 245A and 245B are arranged to be opposite to each other with respect to the zoom-ring rotating direction.

A display window 246 is arranged by cutting out a part of the zoom ring 244 to selectively make visible from outside either the direction indicating part 245A or the other direction indicating part 245B. Reference numeral 247 denotes a switching direction in which the zoom ring 244 is movable when the zoom ring 244 is operated as a changeover switch. The operation and the switching manner of the eighth embodiment are similar to those of the seventh embodiment and are, therefore, omitted from description.

As described above, the eighth embodiment is arranged to permit selection of the zoom-ring rotating direction for zooming. The zooming lens unit, therefore, can be unerringly moved either to a telephoto position or to a wide-angle position.

In the case of the seventh or eighth embodiment described above, this invention is applied to a power focusing device or a power zooming device for an optical apparatus arranged to permit switching, from one direction over to the other, the direction in which an optical system such as a focusing lens unit or a zooming lens unit is to be driven when a rotary operation member such as a focus ring or a zoom ring is operated to rotate. In accordance with this invention, the optical apparatus has, instead of a simple switch, the interchangeable lens arranged to clearly indicate the lens driving direction relative to the rotating direction of the ring, so that the optical apparatus such as a camera can be unerringly operated by the operator.

What is claimed is:

1. An optical apparatus comprising:
   a) driving means for moving an optical member such as a lens along an optical axis thereof;
   b) a rotary operation member arranged to determine a moving direction of said optical member by a rotating direction of said rotary operation member;
   c) switching means arranged to permit switching a relationship between the rotating direction of said rotary operation member and the moving direction of said optical member; and
   d) control means for controlling said driving means to cause said optical member to move in one of two opposite directions on the basis of the rotating direction of said rotary operation member and a switching state of said switching means.

2. An apparatus according to claim 1, wherein said control means controls said driving means in such a manner that, when said switching means is in a first switching state, said driving means causes said optical member to move forward along the optical axis as said rotary operation member is operated to rotate in a first rotating direction, and, when said switching means is in a second switching state, said driving means causes said optical member to move backward along the optical axis as said rotary operation member is operated to rotate in the first rotating direction.

3. An apparatus according to claim 1, wherein said optical apparatus is an interchangeable lens barrel.

4. An apparatus according to claim 1, wherein said optical apparatus is a camera for use with an interchangeable lens.

5. An apparatus according to claim 1, wherein a focusing lens is employed as said optical member.

6. An apparatus according to claim 1, wherein a zooming lens is employed as said optical member.

7. An apparatus according to claim 6, wherein said control means is arranged to control said driving means in such a manner that, when said switching means is in a first switching state, said driving means causes said zooming lens to move toward a wide-angle position as said rotary operation member is operated to rotate in a first rotating direction, and, when said switching means is in a second switching state, said driving means causes said zooming lens to move toward a telephoto position as said rotary operation member is operated to rotate in the first rotating direction.

8. An apparatus according to claim 1, wherein said control means includes a microcomputer.

9. An apparatus according to claim 8, wherein information on a switching state of said switching means is stored in an EEPROM.

10. An apparatus according to claim 1, further comprising:
    rotating amount detecting means for detecting a rotating amount of said rotary operation member;
    moving amount detecting means for detecting a moving amount of said optical member; and
    second control means for causing said driving means to continue a driving action thereof until said moving amount detecting means detects a moving amount of said optical member corresponding to the rotating amount of said rotary operation member detected by said rotating amount detecting means.

11. An apparatus according to claim 10, wherein a focusing lens is employed as said optical member.

12. An apparatus according to claim 10, wherein a zooming lens is employed as said optical member.

13. An apparatus according to claim 1, further comprising:
    display means for displaying the relationship between the rotating direction of said rotary operation member and the moving direction of said optical member selected by said switching means.

14. An optical apparatus comprising:
    a) driving means for moving an optical member including a lens along an optical axis thereof;
    b) a rotary operation member arranged to determine a moving direction of said optical member by a rotating direction of said rotary operation member;
    c) switching means arranged to permit switching a relationship between the rotating direction of said rotary operation member and the moving direction of said optical member, a switching action of said switching means being arranged to be effected by operating said rotary operation member in a manner different from the rotation of said rotary operation member; and
    d) control means for controlling said driving means to cause said optical member to move in one of two opposite directions on the basis of the rotating direction of said rotary operation member and a switching state of said switching means.

15. An apparatus according to claim 14, further comprising:
    display means for displaying the relationship between the rotating direction of said rotary operation member and the moving direction of said optical member selected by said switching means.

16. An apparatus according to claim 14, wherein a focusing lens is employed as said optical member.

17. An apparatus according to claim 14, wherein a zooming lens is employed as said optical member.

18. An apparatus according to claim 15, further comprising:
    rotating amount detecting means for detecting a rotating amount of said rotary operation member;
    moving amount detecting means for detecting a moving amount of said optical member; and
    second control means for causing said driving means to continue a driving action thereof until said moving amount detecting means detects a moving amount of said optical member corresponding to the rotating amount of said rotary operation member detected by said rotating amount detecting means.

* * * * *